July 16, 1935.  V. A. GRODSKY  2,007,969
METHOD OF PROTECTING UNDERGROUND PIPES AND CONDUITS
Filed Oct. 14, 1933
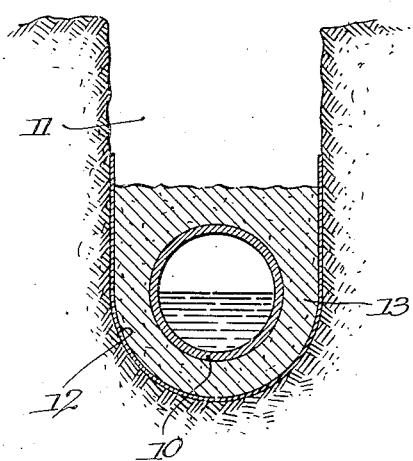
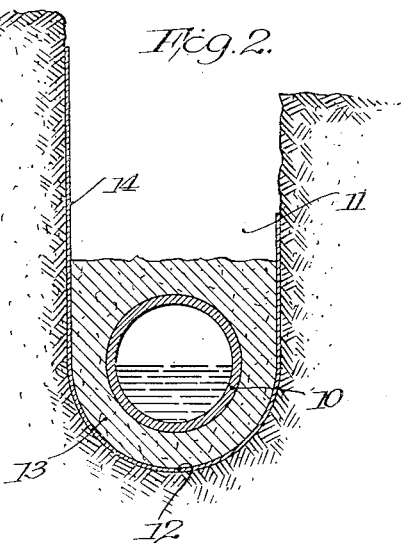
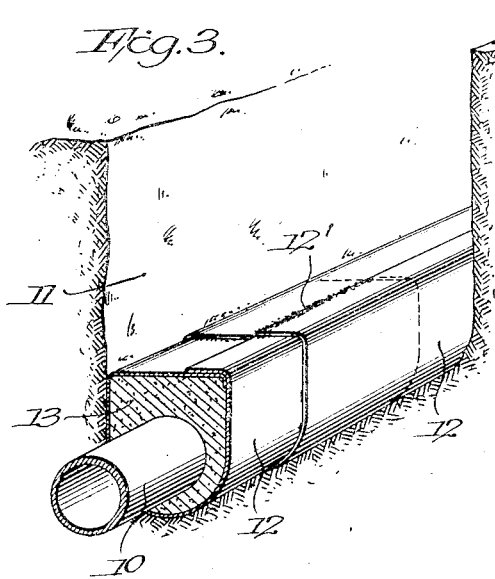
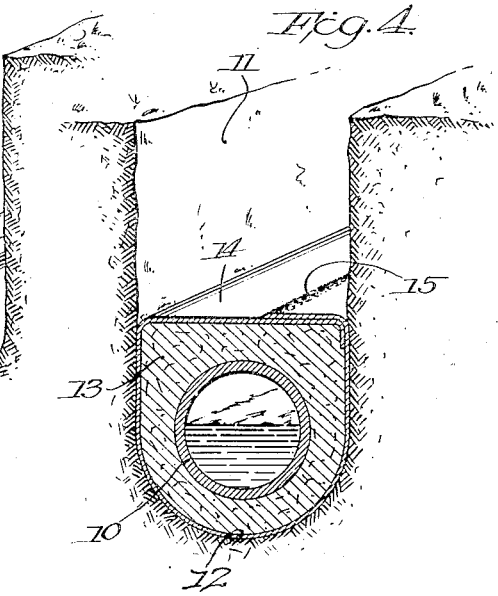
Inventor
Vladimir A. Grodsky.
By Cushman Darby Cushman
Attorneys

UNITED STATES PATENT OFFICE 2,007,969

METHOD OF PROTECTING UNDERGROUND PIPES AND CONDUITS

Vladimir A. Grodsky, Falls Church, Va.

Application October 14, 1933, Serial No. 693,687

4 Claims. (Cl. 61—72)

The present invention relates to a method of protecting metal conduits, such as metal pipes against soil corrosion.

Heretofore in the case of cast and wrought iron pipes, numerous expedients have been employed to overcome the corrosive tendencies. Generally the means utilized has consisted of a wrapping or coating of the pipe with some resistant material which is expensive and has not been sufficiently protective.

My method therefore aims to provide a protective for the pipes which takes into consideration the various soils in which pipes and conduits are usually disposed and without regard to locality. Stated briefly, the present invention is applicable in the case of acid soils which predominate in the East, as well as alkali soils which are to be found in the central and western portions of the United States, and I prepare the soil in such a manner that the corrosive influences present are neutralized and rendered innocuous. This is accomplished preferably by mixing a portion of the soil removed from the trench or excavation with a proper percentage of an inhibiting compound usually an alkali, whereby the acidity is neutralized in the case of acid soils, and the potential acidity is balanced in the case of alkaline soils. The soil as conditioned will comprise a small percentage of the total earth removed from the trench or excavation and is returned in its loose absorbent condition to the trench in the usual manner to fill the same and cover the pipe.

I find it desirable and economical to isolate the portion of the soil so conditioned and returned to the trench for two reasons. First, by isolating the conditioned soil from the remainder of the adjacent soil it is possible to maintain a substantially constant mixture. Again, by isolating or confining the conditioned soil with positive means, I prevent any possibility of the leaching out of the neutralizing agent due to the presence of excess water.

The means which I employ to accomplish this isolation will preferably comprise a waterproof material, such as textile or paper fabric, providing a liner in the lower portion of the trench, and in some cases forming an envelope to completely isolate the pipe and conditioned soil.

Instead of conditioning the soil by mixing a neutralizing agent therewith, I in some cases provide the pipe or conduit with a surrounding layer of the neutralizing or inhibiting agent, and preferably enclose the loose absorbent mass in an envelope of the lining material.

I find as a result of my invention that a thin film, resistant to the effects of oxidation and corrosive influences, is formed on the pipe or conduit. This film is microscopic in character and is continuously formed, so that should it be broken at any point, the break is immediately healed.

I further find as a result of my invention that the corrosive influences active in the presence of moisture, in acid soil or soil containing potential acid forming salts are corrected and rendered substantially innocuous.

In the accompanying drawing,

Figure 1 is a sectional view showing one form of the invention,

Figure 2 is a sectional view showing another form of the invention,

Figure 3 is a perspective view showing the form of the invention shown in Figure 2 with the enveloping flap overlying the pipe, and Figure 4 is a view partly in section illustrating in detail the manner in which a portion of the envelope is folded over the pipe and the soil enclosing the same.

Referring to the drawing, I have indicated at 10 a pipe which may be of cast iron, wrought iron, or pipes or conduits of other metals, such as usually employed in underground conduits for water mains, gas mains, pipe lines and electrical transmitting wires.

The pipe as shown is disposed in an excavation or trench 11 which is dug in the usual manner and a portion of the earth removed therefrom, is first tested to determine its chemical nature. Thereafter, a suitable waterproof fabric which may be textile or paper-like, indicated at 12, is placed in the trench and forms a lining for the same, as shown. This lining will be in the form of strip material and the ends of the strip lengths are overlapped and a suitable waterproof joint provided, as by means of a coating of asphalt or similar moisture resistant material, as shown at 12'.

The conditioned soil, i. e., a small portion of the total earth removed from the trench and sufficient to surround the pipe, is indicated at 13 forming a covering layer.

The soil having been removed and its nature determined, I add thereto one or more of a group of corrosion inhibiting compounds selected from the oxides, hydroxides and carbonates of the alkali metals or alkali earth metals. I prefer to use calcium hydroxide but sodium hydroxide and potassium hydroxide may be employed, as well as calcium oxide, barium oxide, calcium and barium bicarbonate, and in some cases, sodium carbonate. Phosphorus and chromium compounds may also be employed.

As an economical and effective neutralizing i. e., corrosion inhibiting agent, ordinary lime, crushed limestone or burnt lime may be used with advantage.

In order to condition the soil, a sufficient portion thereof to surround the pipe or conduit with a covering layer of the mixture to a depth which will be protective, is suitably mixed with one or a mixture of the above mentioned compounds in proper percentage in relation to the acidity or potential acidity of the soil i. e., in amount to neutralize and correct the corrosive influences of the soil on the metal conduit or pipe. Thereafter the pipe and the loose absorbent conditioned soil are placed in the trench in the manner illustrated in the drawing, whereby the pipe is provided with a surrounding or enclosing layer of the conditioned soil which will protect it against corrosive influences.

Upon examination of the pipe or conduit after it has remained in the ground and surrounded by a layer of the conditioned mixture, it is found that a thin microscopically observable film is produced on the surface. This film is continuous and resistant to oxidation and to other corrosive influences ordinarily due to the nature of the soil and perhaps to the nature of the pipe and which corrosive influences and oxidation take place in the presence of moisture or water.

The presence of the alkali in the case of acid soils tends to eliminate or inhibit oxidation and to neutralize the acidity and hence reduces the corrosive influences. In the case of alkaline soils containing compounds such as chlorides and sulphates, hydrolizing in the presence of water, the addition of the conditioning agents to the soil mixture will tend to neutralize and perhaps prevent or inhibit chemical action, such as will induce corrosion.

The lining or envelope 12, as stated, is waterproof and will prevent the leaching out of the neutralizing or inhibiting compound added to the conditioned soil as, for instance, in the presence of an excess amount of water, and this lining or envelope moreover isolates and confines the pipe and the surrounding protective layer from the remainder of the soil to likewise insure that the constancy of the protective effect will be maintained. That is to say, by segregating and confining the layer of conditioned material from the remainder of the soil, either by a partially closed lining, as shown in Figure 1, or a completely enclosing envelope, as shown in Figure 4, the mixture is confined and the constancy of the mixture and its protective qualities are assured. It should be borne in mind that usually the relative quantity of soil constituting the protective layer is small with respect to the total amount of that excavated.

In Figure 2 I have shown the lining 12 as having a long side 14 which, as shown in Figures 3 and 4, is folded over to form a continuous seal about the pipe and the conditioned layer immediately surrounding it. This is desirable in some cases, although it is not essential and the ends of the envelope are overlapped as shown in Figure 4 and provided with a waterproof seal by means of a suitable composition, such as asphalt, as indicated at 15.

While I have described a conditioning of the soil and forming the same into a protective layer about the pipe or conduit, I will also in some cases, and in lieu of a conditioned soil layer, provide the pipe or conduit with a layer of the conditioning agent only. That is to say, the pipe or conduit will be surrounded and buried in the loose absorbent mass of one or a mixture of the several conditioning agents above referred to. Where I resort to the use of the neutralizing i. e., inhibiting agents alone, instead of a mixture thereof with the soil, I also employ the isolating or confining means in the nature of the lining 12 and preferably utilize the enclosing envelope, as shown in Figure 4. As stated, this envelope will isolate the protective layer from the soil and prevent any leaching or loss of the neutralizing agent due to the presence of water or seepage.

The amount of neutralizing or inhibiting agent mixed with the soil to condition the same will, of course, vary with the particular earth and surrounding conditions and circumstances affecting the installation. Likewise, the thickness of the loose absorbent layer will be varied in accordance with requirements.

The primary purpose of the invention, as will be understood from the above description, is to produce about a pipe or conduit a condition of neutralization of the corrosive influences which are present either actually or potentially in the soil and which, by reason of the presence of moisture or water promote chemical action and oxidation. That is, corrosion inhibiting reagents are employed with or without admixture with soil forming a loose covering layer which is absorbent. This layer is confined by the liner.

My invention affords a very economical means of protecting pipes used in various underground conduits since all that is necessary is to condition the soil by mixing the inhibiting or neutralizing agent therewith. The protective condition is constantly maintained by the presence of the isolating or confining lining which serves to maintain the consistency of the mixture and prevent any loss of the reagent.

Although a number of compounds to be employed as conditioning agents have been recited above, I do not limit myself to any of these since others and equivalent compounds may be employed and found useful under the particular circumstances.

I claim:

1. The method of protecting conduits against soil corrosion comprising preparing a trench to receive the conduit, disposing a waterproof liner in said trench, placing a conduit in the trench and within the confines of said liner, forming between the conduit and liner a neutralized soil covering layer, and confining said covering layer by said liner to prevent deterioration of the neutralized soil.

2. The method of protecting conduits against soil corrosion comprising preparing a trench to receive the conduit, disposing a waterproof liner in said trench, placing a conduit in the trench and within the confines of said liner, neutralizing a portion of the soil removed from the trench, placing said neutralized soil between the conduit and the liner to form a soil covering layer, and confining said covering layer by said liner to prevent deterioration of the neutralized soil.

3. A conduit installation comprising a metal conduit, a layer of loose material, containing a corrosion inhibiting chemical reagent, surrounding said conduit, and a confining means enclosing said layer of loose material.

4. The method of protecting conduits against soil corrosion in acid soils comprising preparing a trench to receive the conduit, disposing a waterproof liner in said trench, placing a conduit in the trench and within the confines of said liner, combining a portion of the soil removed from the trench with an alkaline compound, placing said alkali treated soil between the conduit and the liner to form a soil covering layer, and confining said covering layer by said liner to prevent deterioration of the treated soil.

VLADIMIR A. GRODSKY.